US009355503B2

(12) United States Patent
Nobori

(10) Patent No.: US 9,355,503 B2
(45) Date of Patent: May 31, 2016

(54) IMAGE DISPLAY APPARATUS AND METHOD FOR CONTROLLING THE SAME

(71) Applicant: Seiko Epson Corporation, Tokyo (JP)

(72) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 100 days.

(21) Appl. No.: 13/915,288

(22) Filed: Jun. 11, 2013

(65) Prior Publication Data

US 2013/0335410 A1 Dec. 19, 2013

(30) Foreign Application Priority Data

Jun. 19, 2012 (JP) ................................. 2012-137553

(51) Int. Cl.
*G06T 15/00* (2011.01)
*G06T 19/20* (2011.01)
*H04N 13/00* (2006.01)
*G06T 15/10* (2011.01)
*G06T 19/00* (2011.01)
*G06T 17/20* (2006.01)
*G06T 17/00* (2006.01)

(52) U.S. Cl.
CPC ............ *G06T 19/20* (2013.01); *H04N 13/0022* (2013.01); *G06T 15/00* (2013.01); *G06T 15/10* (2013.01); *G06T 17/00* (2013.01); *G06T 17/20* (2013.01); *G06T 19/00* (2013.01); *H04N 2013/0092* (2013.01)

(58) Field of Classification Search
CPC ......... G06T 19/00; G06T 17/20; G06T 17/00; G06T 15/10; G06T 15/00
USPC ............. 345/419; 382/254, 285, 294; 348/46, 348/49, 50, 47, 42, 43
See application file for complete search history.

(56) References Cited

U.S. PATENT DOCUMENTS

| 7,605,776 | B2 * | 10/2009 | Satoh ................. H04N 13/0003 345/7 |
| 2008/0180550 | A1 * | 7/2008 | Gulliksson ............... 348/231.99 |
| 2010/0039502 | A1 * | 2/2010 | Robinson ........................ 348/47 |
| 2010/0097444 | A1 * | 4/2010 | Lablans ................. G03B 35/00 348/46 |
| 2011/0025825 | A1 * | 2/2011 | McNamer et al. ............... 348/46 |
| 2011/0050864 | A1 * | 3/2011 | Bond ................. H04N 13/0495 348/51 |
| 2011/0255775 | A1 * | 10/2011 | McNamer ............. G06T 7/0075 382/154 |
| 2012/0019524 | A1 | 1/2012 | Nobori |

(Continued)

FOREIGN PATENT DOCUMENTS

| JP | 2000-78615 A | 3/2000 |
| JP | 2005-065162 | 3/2005 |

(Continued)

*Primary Examiner* — Abderrahim Merouan
(74) *Attorney, Agent, or Firm* — ALG Intellectual Property, LLC

(57) ABSTRACT

When a user instructs a control unit about a position in a substantially central portion of an illustration with an electronic pen, the control unit determines a rectangular area that surrounds the illustration as an enhancement area. An image adjustment unit carries out a process of shifting the portion in the enhancement area in an image for the left eye rightward by a predetermined amount and shifting the portion in the enhancement area in an image for the right eye leftward by a predetermined amount. As a result, the illustration located in the enhancement area is so changed that the image for the left eye is shifted to a position to the right of the image for the right eye and hence recognized as if the illustration were located in front of other illustrations. The illustration in the enhancement area is thus enhanced.

10 Claims, 5 Drawing Sheets

(56) References Cited

U.S. PATENT DOCUMENTS

| | | |
|---|---|---|
| 2012/0019568 A1 | 1/2012 | Nobori |
| 2012/0075292 A1* | 3/2012 | Yamaji et al. ................. 345/419 |
| 2012/0105602 A1* | 5/2012 | McNamer et al. .............. 348/50 |
| 2013/0016191 A1* | 1/2013 | Katayama ....................... 348/49 |
| 2013/0107018 A1* | 5/2013 | Sakurabu ........................ 348/49 |
| 2014/0327744 A1* | 11/2014 | Gotoh ............................. 348/49 |

FOREIGN PATENT DOCUMENTS

| | | |
|---|---|---|
| JP | 2011-002650 A | 1/2011 |
| JP | 2011-257845 A | 12/2011 |
| JP | 2012-28963 A | 2/2012 |
| JP | 2012-28964 A | 2/2012 |
| JP | 2012-28965 A | 2/2012 |
| JP | 2012-105172 | 5/2012 |
| JP | 2012-227682 A | 11/2012 |

\* cited by examiner

IMAGE DISPLAY APPARATUS AND METHOD FOR CONTROLLING THE SAME

The entire disclosure of Japanese Patent Application No. 2012-137553, filed Jun. 19, 2012 is expressly incorporated by reference herein.

BACKGROUND

1. Technical Field

The present invention relates to an image display apparatus that allows a viewer to recognize displayed images as a stereoscopic image and a method for controlling the image display apparatus.

2. Related Art

To allow a viewer to recognize images displayed by a projector or any other image display apparatus as a stereoscopic image, there are a variety of proposed technologies that allow the viewer to recognize different images (parallax images) with the left and right eyes (see JP-A-2011-257645, for example). In any of the technologies, a stereoscopic sensation recognized by the viewer changes in accordance with the amount of parallax between an image for the right eye and an image for the left eye. JP-A-2000-78615 describes a digital broadcasting receiver capable of adjusting the amount of parallax by changing the horizontal positions where an image for the left eye and an image for the right eye are displayed.

The technology described in JP-A-2000-78615 allows adjustment of the stereoscopic sensation provided by the entire image by changing the positional relationship between an image for the right eye and an image for the left eye but cannot partially adjust the stereoscopic sensation. It is therefore required to provide a technology that allows part of an image to be enhanced by adjusting a stereoscopic sensation in a desired position in the image.

SUMMARY

An advantage of some aspects of the invention is to solve at least apart of the problems described above, and some aspects of the invention can be implemented in the following forms or application examples.

Application Example 1

An image display apparatus according to this application example is an image display apparatus that allows recognition of a stereoscopic image based on binocular parallax and includes a display unit that displays an image for the left eye and an image for the right eye, an instruction input unit that receives instruction operation by which an area in the stereoscopic image is instructed, and an image adjustment unit that adjusts the amount of parallax in the area instructed by the instruction operation and the amount of parallax in an area outside the instructed area using different amounts of adjustment.

According to the image display apparatus of this application example, since the image adjustment unit adjusts the amount of parallax in the area instructed by the instruction operation and the amount of parallax in the area outside the instructed area using different amounts of adjustment, a stereoscopic sensation provided by an image can be partially adjusted, and a desired area in the image can be enhanced.

Application Example 2

In the image display apparatus according to the application example described above, it is preferable that the image adjustment unit adjusts the amounts of parallax in such a way that the area instructed by the instruction operation is recognized as if the instructed area were located in front of the area outside the instructed area.

According to the image display apparatus of this application example, since the image adjustment unit adjusts the amounts of parallax in such a way that the area instructed by the instruction operation is recognized as if the instructed area were located in front of the area outside the instructed area, the instructed area is enhanced and the line of sight of a viewer can be guided to the enhanced area.

Application Example 3

In the image display apparatus according to the application example described above, the image adjustment unit may shift the area instructed by the instruction operation in at least one of the image for the left eye and the image for the right eye.

Application Example 4

In the image display apparatus according to the application example described above, the image adjustment unit may shift an area outside the area instructed by the instruction operation in at least one of the image for the left eye and the image for the right eye.

Application Example 5

A method for controlling an image display apparatus according to this application example is a method for controlling an image display apparatus that displays an image for the left eye and an image for the right eye and allows recognition of a stereoscopic image based on binocular parallax, the method including an instruction input step of receiving instruction operation by which an area in the stereoscopic image is instructed and an image adjustment step of adjusting the amount of parallax in the area instructed in the instruction input step and the amount of parallax in an area outside the instructed area using different amounts of adjustment.

According to the method for controlling an image display apparatus of this application example, since the amount of parallax in the area instructed in the instruction input step and the amount of parallax in the area outside the instructed area are adjusted using different amounts of adjustment in the image adjustment step, a stereoscopic sensation provided by an image can be partially adjusted, and a desired area in the image can be enhanced.

Application Example 6

In the method for controlling an image display apparatus according to the application example described above, in the image adjustment step, the amounts of parallax are desirably so adjusted that the area instructed by the instruction operation is recognized as if the instructed area were located in front of the area outside the instructed area.

According to the method for controlling an image display apparatus of this application example, since the amounts of parallax are adjusted in the image adjustment step in such a way that the area instructed by the instruction operation is recognized as if the instructed area were located in front of the area outside the instructed area, the instructed area is enhanced and the line of sight of a viewer can be guided to the enhanced area.

Application Example 7

In the method for controlling an image display apparatus according to the application example described above, in the image adjustment step, the area instructed by the instruction operation in at least one of the image for the left eye and the image for the right eye may be shifted.

Application Example 8

In the method for controlling an image display apparatus according to the application example described above, in the image adjustment step, an area outside the area instructed by the instruction operation in at least one of the image for the left eye and the image for the right eye may be shifted.

When the image display apparatus and the method for controlling the same described above are configured using a computer, the aspects and the application examples described above can also be configured in the form of a program for providing the functions described in the aspects and the application examples or a recording medium or any other component on which the program is so recorded that it is readable by the computer. The recording medium can be a flexible disk; a hard disk; a CD, a DVD, and other optical disks; a magneto-optical disk; a memory card and a USB memory in which a nonvolatile semiconductor memory is incorporated; an internal storage device in the image display apparatus (RAM, ROM, or any other semiconductor memory); and a variety of other media readable by the computer.

BRIEF DESCRIPTION OF THE DRAWINGS

The invention will be described with reference to the accompanying drawings, wherein like numbers reference like elements.

FIG. 4A shows a projected image before the enhancement process is carried out; FIG. 4B shows an image for the left eye during the enhancement process; FIG. 4C shows an image for the right eye during the enhancement process; and FIG. 4D shows the projected image after the enhancement process is carried out.

FIG. 5A shows a projected image before the enhancement process is carried out; FIG. 5B shows an image for the left eye during the enhancement process; FIG. 5C shows an image for the right eye during the enhancement process; and FIG. 5D shows the projected image after the enhancement process is carried out.

DESCRIPTION OF EXEMPLARY EMBODIMENTS

First Embodiment

An image display system according to a first embodiment will be described below with reference to the drawings.

Figure 1:
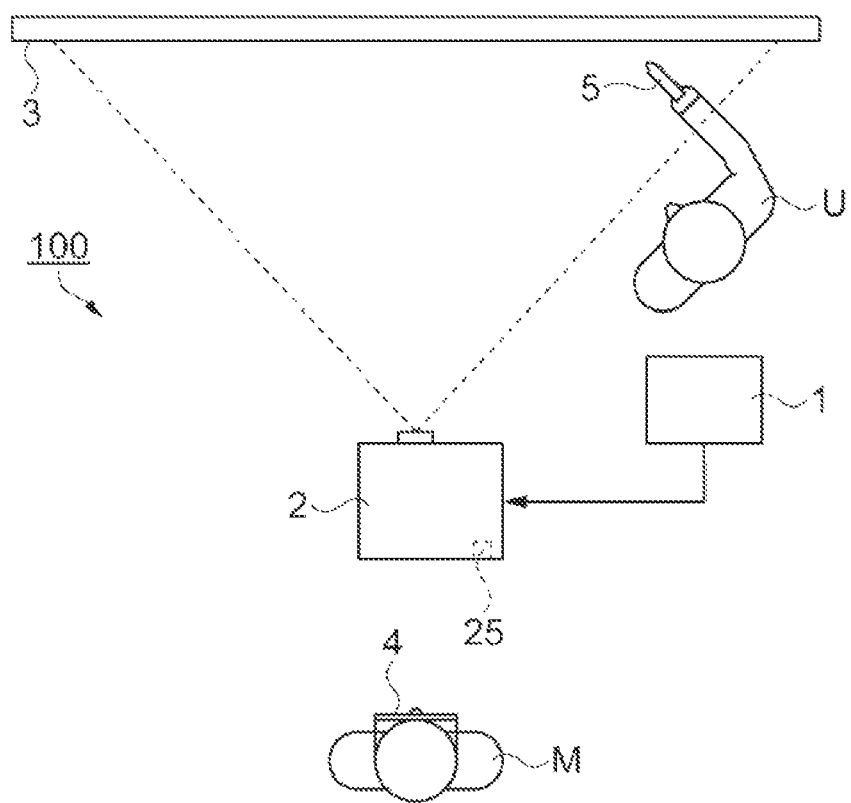
FIG. 1 is a plan view showing a schematic configuration of an image display system.

FIG. 1 is a plan view showing a schematic configuration of the image display system according to this embodiment.

An image display system 100 is a system that allows a viewer M to recognize a stereoscopic image based on binocular parallax and includes an image supply apparatus 1, which supplies image information, a projector 2 as an image display apparatus, a screen 3 as a projection surface onto which an image is projected from the projector 2, liquid crystal shutter glasses 4 as a shutter apparatus, and an electronic pen 5, as shown in FIG. 1.

The image supply apparatus 1 supplies the projector 2 with image information that allows the viewer to recognize a stereoscopic image. In the present embodiment, the image supply apparatus 1 outputs image information configured based on a side-by-side method in which left-eye image information representing an image for the left eye and right-eye image information representing an image for the right eye are disposed on the left side and the right side to form a single frame.

The projector 2 alternately switches an image for the left eye to an image for the right eye and vice versa based on the image information supplied from the image supply apparatus 1 to project the images on the screen 3. The projector 2 includes a sync signal transmitter 25, which transmits a sync signal for setting action timing of the liquid crystal shutter glasses 4 in wireless communication using, for example, a radio wave or infrared light. The sync signal causes the liquid crystal shutter glasses 4 to act in synchronization with the image switching operation performed by the projector 2 between an image for the left eye and an image for the right eye.

The liquid crystal shutter glasses 4 are worn by the viewer M, who views images. The liquid crystal shutter glasses 4 include a left-eye liquid crystal shutter that faces the left eye of the viewer M and a right-eye liquid crystal shutter that faces the right eye of the viewer M, and each of the liquid crystal shutters is capable of switching its state between a transmission state in which it transmits light and a blockage state in which it blocks light. The liquid crystal shutter glasses 4 are provided with a receiver (not shown) that receives the sync signal transmitted from the projector 2. The liquid crystal shutter glasses 4 cause the left and right liquid crystal shutters to alternately be switched to the transmission state in synchronization with the received sync signal so that an image for the left eye is recognized only with the left eye of the viewer and an image for the right eye is recognized only with the right eye of the viewer. The liquid crystal shutter glasses 4 may be replaced with shutter glasses that open and close shutters based on a method that does not use a liquid crystal material.

The electronic pen 5 corresponds to an instruction unit for issuing a variety of instructions to the projector 2 and includes a press switch and a light emitter (light emitting diode, for example) at the front end (nib) of a pen-shaped body, and the light emitter emits light of a predetermined frequency band (infrared light, for example). When a user U of the image display system 100 presses the nib of the electronic pen 5 against the screen 3 (pressing operation), the press switch is pressed and the light emitter emits the light. It is noted that the user U may be the viewer M.

Figure 2:
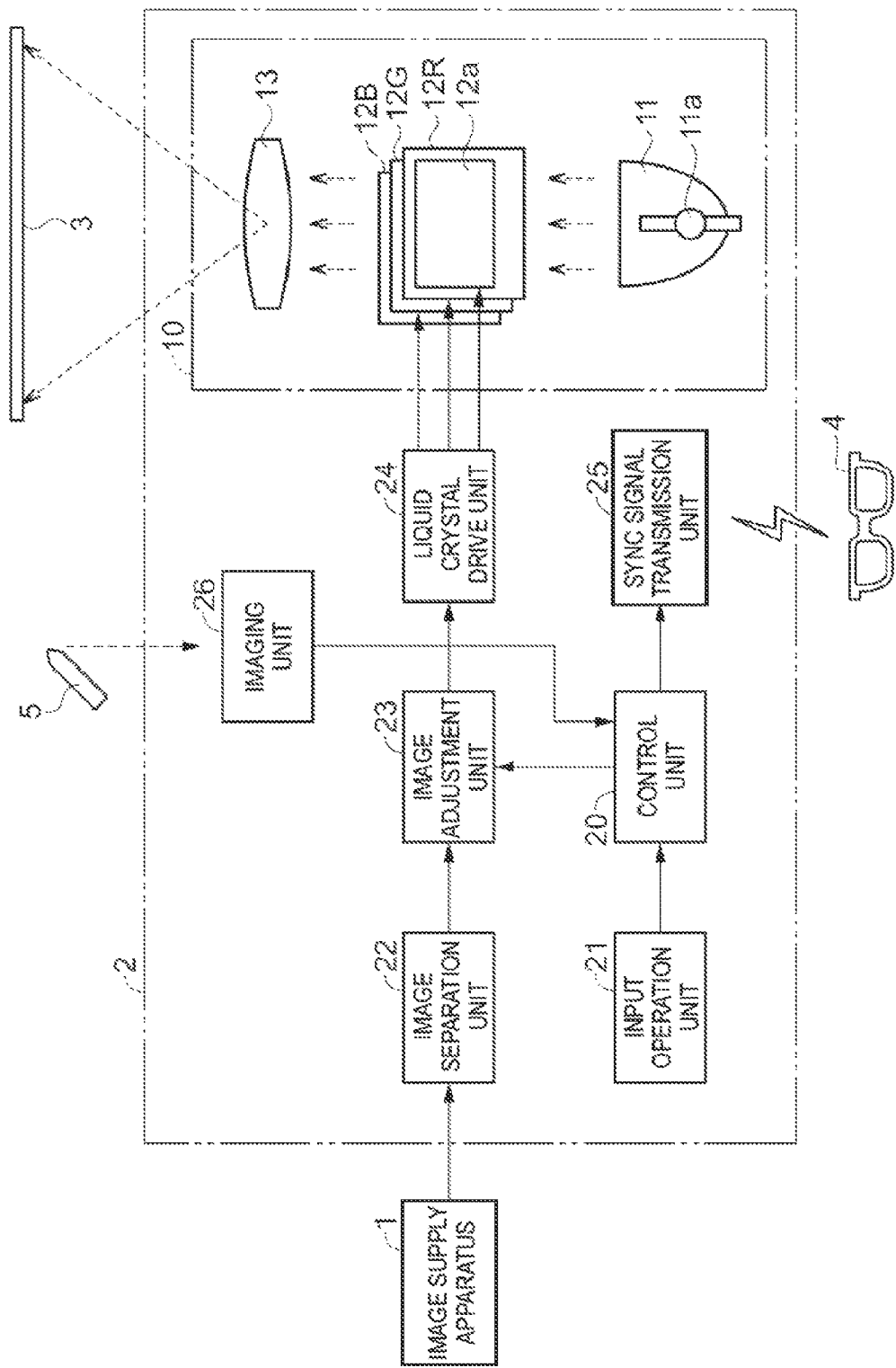
FIG. 2 is a block diagram showing an internal configuration of a projector.

FIG. 2 is a block diagram showing an internal configuration of the projector 2.

The projector 2 includes an image projection unit 10, a control unit 20, an input operation unit 21, an image separation unit 22, an image adjustment unit 23, a liquid crystal drive unit 24, a sync signal transmission unit 25, and an imaging unit 26, as shown in FIG. 2.

The image projection unit 10 includes a light source section 11 as a light source, three liquid crystal light valves 12R, 12G, and 12B as light modulators, and a projection lens 13 as a projection system. The image projection unit 10, which corresponds to a display unit, uses the liquid crystal light valves 12R, 12G, and 12B to modulate light outputted from the light source section 11 into image light and projects the image light through the projection lens 13 to display an image on the screen 3. The display unit may be an apparatus that displays an image on an object external to the image display apparatus (projector 2), as the image projection unit 10 in the present embodiment does, or may be an apparatus that displays an image in the image display apparatus itself. A conceivable example of the display unit that displays an image in the image display apparatus itself is a case where the image display apparatus is formed, for example, of a liquid crystal display.

The light source section 11 includes a discharge-type light source lamp 11a formed, for example, of an ultrahigh-pressure mercury lamp or a metal halide lamp. The light outputted from the light source section 11 is converted by an optical integration system (not shown) into light having a substantially uniform intensity distribution and separated into red (R), green (G), and blue (B) color light components by a color separation system (not shown), which are then incident on the liquid crystal light valves 12R, 12G, and 12B respectively.

Each of the liquid crystal light valves 12R, 12G, and 12B is formed, for example, of a transmissive liquid crystal panel in which a pair of transparent substrates seals a liquid crystal material. Each of the liquid crystal light valves 12R, 12G, and 12B has a rectangular pixel area 12a, in which a plurality of pixels (not shown) are arranged in a matrix, and a drive voltage is applicable to the liquid crystal material on a pixel basis. When the liquid crystal drive unit 24 applies a drive voltage according to the image information to each of the pixels, the pixel is set to have light transmittance according to the image information. The light outputted from the light source section 11 is therefore modulated when passing through the pixel area 12a of each of the liquid crystal light valves 12R, 12G, and 12B to form image light according to the image information. The thus formed color image light fluxes are combined with each other on a pixel basis by a light combining system (not shown) to form color image light, which is projected through the projection lens 13 onto the screen 3.

The control unit 20 includes a CPU (central processing unit), a RAM (random access memory) used to temporarily store, for example, a variety of data, and a ROM (read only memory) that is a nonvolatile memory. The control unit 20, in which the CPU acts in accordance with a control program stored in the ROM, controls the action of the projector 2.

The input operation unit 21, which receives input operation performed by the user U, includes a plurality of operation keys (not shown) that allow the user U to issue a variety of instructions to the projector 2. When the user U operates any of the variety of operation keys on the input operation unit 21, the input operation unit 21 receives the operation and outputs a control signal corresponding to the operated operation key to the control unit 20. Upon the input of the control signal from the input operation unit 21, the control unit 20 carries out a process based on the inputted control signal to control the action of the projector 2. The input operation unit 21 may alternatively be formed of a remote control (not shown) that allows remote operation. In this case, the remote control transmits an infrared-light operation signal according to operation performed by the user U, and a receiver (not shown) receives the operation signal and forwards it to the control unit 20.

The image separation unit 22 separates the image information configured based on the side-by-side method and inputted from the image supply apparatus 1 into image information for the left eye and image information for the right eye. The image separation unit 22 then performs resolution conversion on the separated image information in such a way that the resolution thereof matches with the resolution of the liquid crystal light valves 12R, 12G, and 12B. The image separation unit 22 then outputs the converted image information to the image adjustment unit 23.

The image adjustment unit 23 makes stereoscopic sensation adjustment on the image information for the left eye and the image information for the right eye inputted from the image separation unit 22 by changing the amount of parallax between the image for the left eye and the image for the right eye under the control of the control unit 20. The image adjustment unit 23 then outputs the processed image information on a frame basis, that is, right and left frames one at a time, to the liquid crystal drive unit 24.

The liquid crystal drive unit 24 drives the liquid crystal light valves 12R, 12G, and 12B in accordance with the image information inputted from the image adjustment unit 23. The light outputted from the light source section 11 is therefore modulated by the liquid crystal light valves 12R, 12G, and 12B into image light according to the image information, and the image light is projected through the projection lens 13. An image for the left eye based on the image information for the left eye and an image for the right eye based on the image information for the right eye are thus alternately displayed on the screen 3.

The sync signal transmission unit 25 transmits a sync signal that causes the liquid crystal shutter glasses 4 to act in synchronization with the image switching operation between an image for the left eye and an image for the right eye under the control of the control unit 20, as described above.

The imaging unit 26 includes an imaging device or any other device (not shown) formed, for example, of a CCD (charge coupled device) sensor or a CMOS (complementary metal oxide semiconductor) sensor and captures an image of an area including the image projected on the screen 3 (projected image). The imaging unit 26 then outputs image information representing the image having been captured (captured image) to the control unit 20 as an imaging result. The imaging unit 26 is capable of capturing an image formed by the infrared light emitted from the electronic pen 5. When the user U presses the electronic pen 5 within the projected image, the infrared light emitted from the electronic pen 5 is recorded in the captured image. The imaging unit 26 repeatedly captures images in a short cycle in order to monitor the light emission from the electronic pen 5 and successively outputs imaging results to the control unit 20.

It is noted that calibration for relating a projected image and a captured image to each other is performed in advance. Upon input of image information from the imaging unit 26, the control unit 20 can therefore recognize the position on the projected image where the electronic pen 5 has emitted the light.

Figure 3:
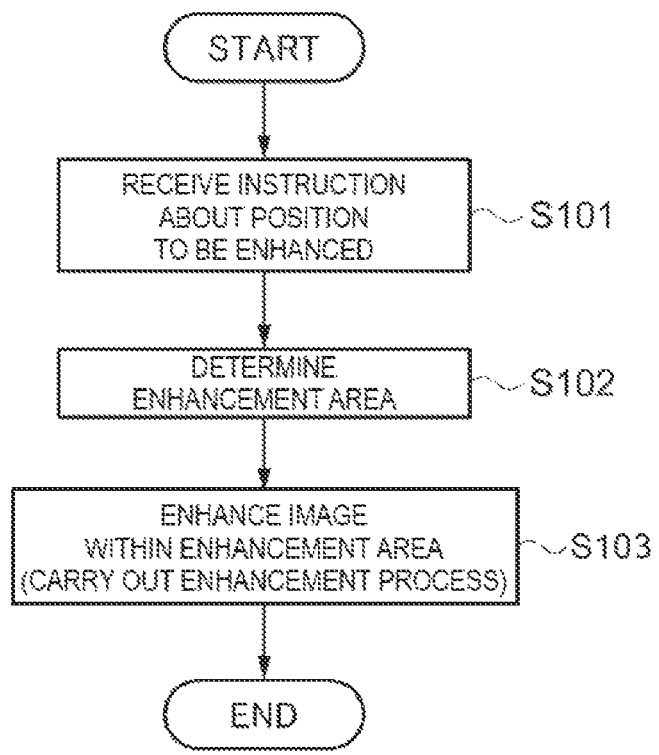
FIG. 3 shows a flowchart for describing the action of the projector.

FIG. 3 shows a flowchart for describing the action of the projector 2.

The projector 2 according to the present embodiment is capable of adjusting a stereoscopic sensation provided by a portion of an image to enhance the portion. The input operation unit 21 has an operation key for enhancing a portion of an image (enhancement key) (not shown). When the user U operates the enhancement key, the projector 2 acts in accordance with the flowchart shown in FIG. 3.

The control unit 20 first receives an instruction from the user U about a position to be enhanced (step S101), as shown in FIG. 3. The user U can issue an instruction about a desired position L in a projected image Pa (see FIG. 4A) projected on the screen 3 by pressing the electronic pen 5. Upon the instruction from the user U about the position L, the control unit 20 determines a rectangular area having a predetermined size around the instructed position L as an area to be enhanced (enhancement area E) (step S102). The control unit 20 then notifies the image adjustment unit 23 of the position of the enhancement area E and instructs the image adjustment unit 23 to enhance the image within the enhancement area E (step S103). Upon reception of the instruction from the control unit 20, the image adjustment unit 23 carries out an enhancement process of enhancing the image within the enhancement area E.

Figure 4A:
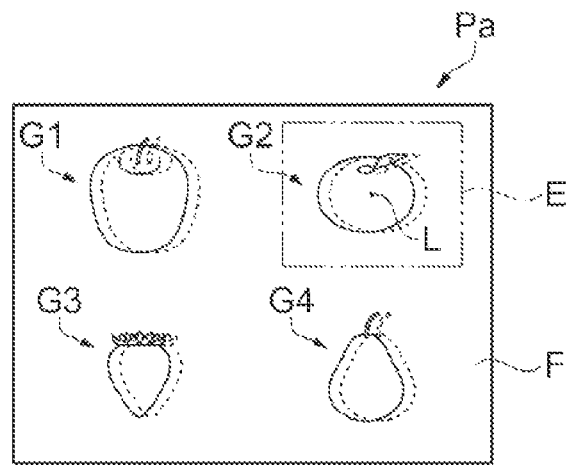
FIGS. 4A to 4D are descriptive views for describing an enhancement process carried out by an image adjustment unit in a first embodiment.
Figure 4B:
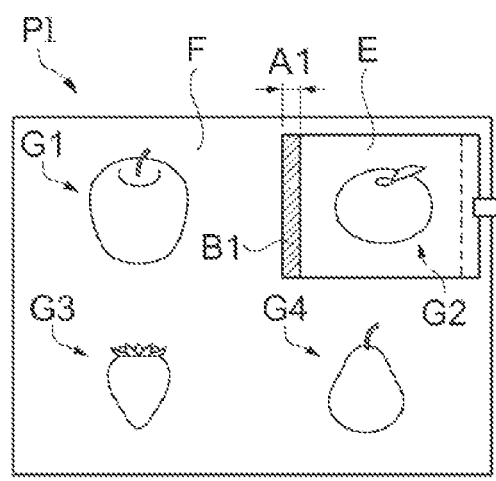
Figure 4C:
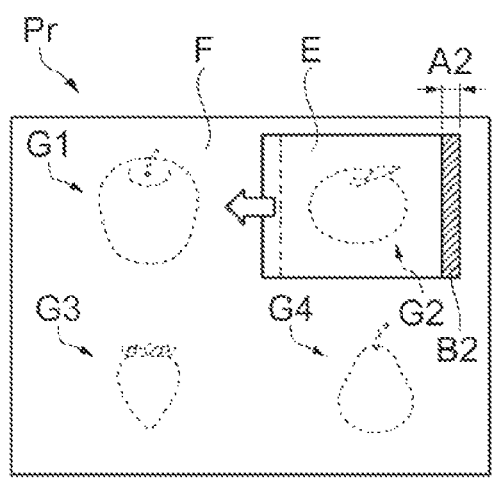
Figure 4D:
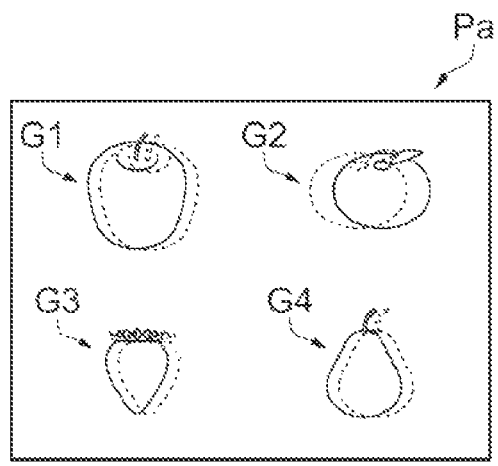

FIGS. 4A to 4D are descriptive views for describing the enhancement process carried out by the image adjustment unit 23. FIG. 4A shows a projected image before the enhancement process is carried out. FIG. 4B shows an image for the left eye during the enhancement process. FIG. 4C shows an image for the right eye during the enhancement process. FIG. 4D shows the projected image after the enhancement process is carried out. In FIGS. 4A to 4D, the solid line represents the image for the left eye in the projected image, and the broken line represents the image for the right eye in the projected image. FIGS. 4A and 4D each show a state in which the image for the left eye and the image for the right eye are combined with each other.

The projected image Pa includes, for example, four illustrations G1 to G4 arranged on a white solid color background, as shown in FIG. 4A. In each of the illustrations G1 to G4, the image for the left eye (solid line) is located to the left of the image for the right eye (broken line), and the viewer M who wears the liquid crystal shutter glasses 4 recognizes as if the illustrations G1 to G4 were located behind the screen 3. When the user U operates the enhancement key on the input operation unit 21 and then instructs the control unit 20 with the electronic pen 5 about the position L in a substantially central portion of the upper right illustration G2, the control unit 20 determines a rectangular area that surrounds the illustration G2 as the enhancement area E and instructs the image adjustment unit 23 to carry out the enhancement process of enhancing the enhancement area E.

The image adjustment unit 23 adjusts the amount of parallax in the enhancement area E and the amount of parallax outside the enhancement area E (non-enhancement area F) using different amounts of adjustment in response to the instruction from the control unit 20. In other words, the image adjustment unit 23 changes the amount of parallax in the enhancement area E relative to the amount of parallax in the other area (non-enhancement area F) in response to the instruction from the control unit 20. Specifically, the image adjustment unit 23 shifts the portion in the enhancement area E in an image for the left eye Pl rightward by a predetermined amount A1 and shifts the portion in the enhancement area E in an image for the right eye Pr leftward by a predetermined amount A2, as shown in FIGS. 4B and 4C. A gap B1 created to the left of the enhancement area E in the image for the left eye Pl when the enhancement area E is shifted rightward and a gap B2 created to the right of the enhancement area E in the image for the right eye Pr when the enhancement area E is shifted leftward maybe filled with the background color (white) of the projected image Pa.

As a result, the illustration G2 located in the enhancement area E is so changed that the image for the left eye (solid line) is shifted to a position to the right of the image for the right eye (broken line) as shown in FIG. 4D, whereby the illustration G2 is recognized as if it were located in front of the other illustrations G1, G3, and G4. The illustration G2 is thus enhanced.

As described above, the image display system 100 (projector 2) according to the present embodiment provides the following advantageous effects.

1. According to the projector 2 of the present embodiment, since the image adjustment unit 23 changes the amount of parallax in a position instructed with the electronic pen 5 relative to the amounts of parallax in the other positions, a stereoscopic sensation provided by an image can be partially adjusted, and a desired position in the image can be enhanced.

2. According to the projector 2 of the present embodiment, since the image adjustment unit 23 changes the amount of parallax in such a way that the position instructed with the electronic pen 5 is recognized as if the position were located in front of the other positions, the instructed position is enhanced and the line of sight of the viewer M can be guided to the enhanced area.

In the present embodiment, the imaging unit 26 and the control unit 20 that carries out step S101 correspond to an instruction input unit. Further, the pressing operation performed on the electronic pen 5 corresponds to instruction operation. Moreover, in the present embodiment, the amount of shift of the enhancement area E, that is, the amount of shift of the image for the left eye P1 (predetermined amount A1 of rightward shift) and the amount of shift of the image for the right eye Pr (predetermined amount A2 of leftward shift), correspond to the amount of adjustment of the amount of parallax in the enhancement area E. On the other hand, since the non-enhancement area F is fixed, the amount of adjustment of the amount of parallax in the non-enhancement area F is zero.

Second Embodiment

An image display system according to a second embodiment will be described below with reference to the drawings.

An image display system 100 according to the second embodiment has the same configuration as that in the first embodiment, but the action of the projector 2 differs from that in the first embodiment. The projector 2 according to the first embodiment shifts the enhancement area E in each of an image for the left eye and an image for the right eye to enhance the image in the enhancement area E, whereas the projector 2 according to the present embodiment shifts the non-enhancement area F outside the enhancement area E with the enhancement area E fixed.

Figure 5A:
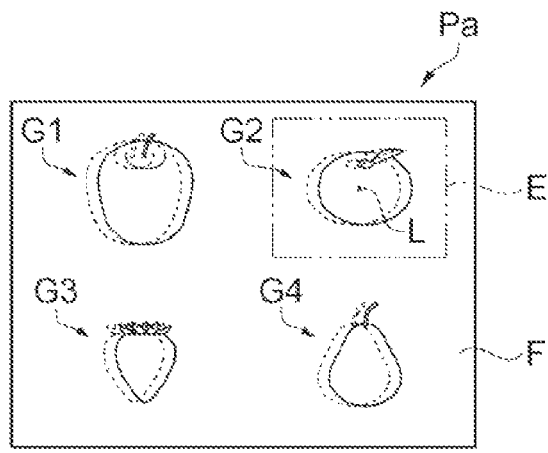
FIGS. 5A to 5D are descriptive views for describing the enhancement process carried out by the image adjustment unit in a second embodiment.
Figures 5B, 5C:
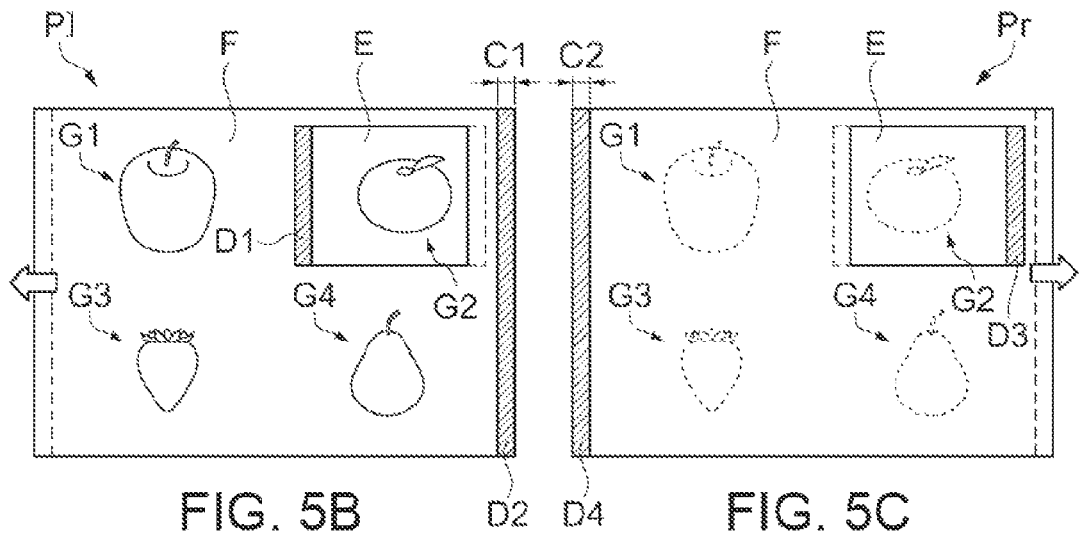
Figure 5D:
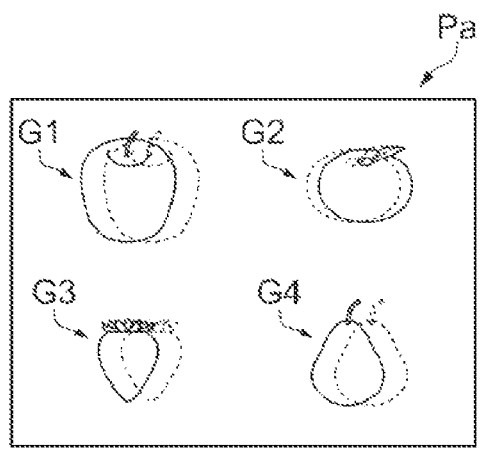

FIGS. 5A to 5D are descriptive views for describing the enhancement process carried out by the image adjustment unit 23 in the present embodiment. FIG. 5A shows a projected image before the enhancement process is carried out. FIG. 5B shows an image for the left eye during the enhancement process. FIG. 5C shows an image for the right eye during the enhancement process. FIG. 5D shows the projected image after the enhancement process is carried out.

A projected image Pa includes, for example, four illustrations G1 to G4 arranged on a white solid color background, as shown in FIG. 5A. In the present embodiment, in each of the illustrations G1 to G4, the image for the left eye (solid line) is located to the right of the image for the right eye (broken line), and the viewer M who wears the liquid crystal shutter glasses 4 recognizes as if the illustrations G1 to G4 were located in front of the screen 3. When the user U operates the enhancement key on the input operation unit 21 and then instructs the control unit 20 with the electronic pen 5 about the position L in a substantially central portion of the upper right illustration G2, the control unit 20 determines a rectangular area that surrounds the illustration G2 as the enhancement area E and instructs the image adjustment unit 23 to carry out the enhancement process of enhancing the enhancement area E.

The image adjustment unit 23 adjusts the amount of parallax in the enhancement area E and the amount of parallax outside the enhancement area E (non-enhancement area F) using different amounts of adjustment in response to the instruction from the control unit 20. In other words, the image adjustment unit 23 changes the amount of parallax in the enhancement area E relative to the amount of parallax in the non-enhancement area F in response to the instruction from the control unit 20. Specifically, the image adjustment unit 23 shifts the portion other than the portion in the enhancement area E in an image for the left eye P1, that is, the portion in the non-enhancement area F, leftward by a predetermined amount C1 and shifts the portion other than the portion in the enhancement area E in an image for the right eye Pr, that is, the portion in the non-enhancement area F, rightward by a predetermined amount C2, as shown in FIGS. 5B and 5C. In the present embodiment, the amount of parallax in the enhancement area E is thus changed relative to the amount of parallax in the non-enhancement area F by changing the amount of parallax in the non-enhancement area F with the enhancement area E fixed. A gap D1 created to the left of the enhancement area E in the image for the left eye P1 and a gap D2 created to the right of the non-enhancement area F when the non-enhancement area F is shifted leftward and a gap D3 created to the right of the enhancement area E in the image for the right eye Pr and a gap D4 created to the left of the non-enhancement area F when the non-enhancement area F is shifted rightward may be filled with the background color of the projected image Pa.

As a result, each of the illustrations G1, G3, and G4 located in the non-enhancement area F is so changed that the image for the left eye (solid line) is shifted to a position to the left of the image for the right eye (broken line) as shown in FIG. 5D, and the illustrations G1, G3, and G4 are recognized as if they were located behind the screen 3. That is, the illustration G2 in the enhancement area E is recognized as if it were located in front of the other illustrations G1, G3, and G4, whereby the illustration G2 is enhanced as compared with the other illustrations G1, G3, and G4.

As described above, the image display system 100 (projector 2) according to the present embodiment provides the same advantageous effects as those provided in the first embodiment.

In the present embodiment, the amount of shift of the non-enhancement area F, that is, the amount of shift of the image for the left eye P1 (predetermined amount C1 of leftward shift) and the amount of shift of the image for the right eye Pr (predetermined amount C2 of rightward shift), correspond to the amount of adjustment of the amount of parallax in the non-enhancement area F. On the other hand, since the enhancement area E is fixed, the amount of adjustment of the amount of parallax in the enhancement area E is zero.

Variations

The embodiments described above may be changed as follows.

In the embodiments described above, the display method that allows the viewer M to recognize a stereoscopic image is a frame sequential method in which an image for the left eye and an image for the right eye are alternately displayed in a time division manner and viewed through the liquid crystal shutter glasses 4, but the display method is not limited to the frame sequential method. For example, the display method may alternatively be a polarization method in which an image for the left eye and an image for the right eye having different polarization directions are viewed through polarization glasses. The display method may still alternatively be a method that allows the viewer to view images with naked eye without wearing dedicated glasses, such as a parallax barrier method and a lenticular method.

In the embodiments described above, the image adjustment unit 23 makes the adjustment in such a way that the portion in the enhancement area E is recognized as if it were located in front of the other portion (non-enhancement area F), but the adjustment may alternatively be so made that the portion in the enhancement area E is recognized as if it were located behind the portion in the non-enhancement area F. It is, however, noted that the enhancement area E is desirably located in front of the non-enhancement area F in order to enhance the enhancement area E. In this process, the enhancement area E is not necessarily located in front of the screen 3 but only needs to be located in front of the non-enhancement area F.

The above embodiments have been described with reference to the case where the amount of parallax in the enhancement area E is changed with the amount of parallax in the non-enhancement area F fixed (first embodiment) and the case where the amount of parallax in the non-enhancement area F is changed with the amount of parallax in the enhancement area E fixed (second embodiment). Alternatively, the amount of parallax in both the enhancement area E and the non-enhancement area F may be changed. For example, the adjustment may be so made that the image in the enhancement area E is located forward and the image in the non-enhancement area F is located backward.

In the embodiments described above, the amount of shift of an image for the left eye (predetermined value A1, C1) and the amount of shift of an image for the right eye (predetermined value A2, C2) maybe the same or may differ from each other. Further, both an image for the left eye and an image for the right eye are not necessarily shifted, but only one of them may be shifted.

The above embodiments have been described with reference to the case where a projected image Pa has a solid color background, but the invention is also applicable to an image having a non-solid-color background. When a projected image Pa does not have a solid-color background, the color of each of the gaps B1, B2, and D1 to D4 created when the enhancement area E is shifted may be set as appropriate. For example, each of the gaps B1 and B2 may be filled with the color of the pixels adjacent to the left or right of the gap or may be filled with a color between the color of the pixels adjacent to the left of the gap and the color of the pixels adjacent to the right of the gap (average color, for example). Alternatively, linear interpolation may be performed based on the color of the pixels adjacent to the left of the gap and the color of the pixels adjacent to the right of the gap, and the color may be gradually changed with the position in the gap. Further, a projected image Pa is not limited to an image containing the plurality of illustrations G1 to G4 and may, for example, be a single photograph. Moreover, a projected image Pa is not limited to a still image and may be motion images.

In the embodiments described above, a rectangular area having a predetermined size around the position L instructed by the user U is determined as the enhancement area E, but the enhancement area E is not necessarily determined this way. For example, the size of the enhancement area E may be specified by indicating two diagonal points of the enhancement area E with the electronic pen 5, or the user may draw a line that surrounds an area with the electronic pen 5 and the surrounded area may be determined as the enhancement area E. Alternatively, a projected image Pa may be divided into a plurality of areas in advance and a desired area may be selected from the plurality of areas.

In the embodiments described above, the enhancement process (steps S101 to S103) is carried out when the enhancement key on the input operation unit 21 is operated, but operation that triggers the enhancement process is not limited to the operation described above. For example, a tool bar containing a plurality of button images may be displayed in a projected image Pa, and the enhancement process may be carried out when a predetermined button image is selected by user's pressing operation of the electronic pen 5.

In the embodiments described above, a side-by-side method is employed as a method for transmitting image information from the image supply apparatus 1 to the projector 2, but the transmission method is not limited thereto. For example, the transmission method may alternatively be a top-and-bottom method. Still alternatively, the transmission method may be a method for alternately transmitting image information for the left eye and image information for the right eye on a frame basis.

In the embodiments described above, the image supply apparatus 1 supplies the projector 2 with image information that allows the viewer to recognize a stereoscopic image (image information for the left eye and image information for the right eye). The image supply apparatus 1 may alternatively supply the projector 2 with typical image information representing a two-dimensional image. In this case, for example, the image separation unit 22 may produce image information for the left eye and image information for the right eye formed of the same content based on the inputted image information, and the image adjustment unit 23 may carry out the enhancement process on the enhancement area E in an image for the left eye and the enhancement area E in an image for the right eye.

The projector 2 according to each of the embodiments described above uses the transmissive liquid crystal light valves 12R, 12G, and 12B as the light modulators. Reflective liquid crystal light valves or any other reflective light modulators may alternatively be used. Further, a micromirror array device that modulates light emitted from a light source by controlling the exiting direction of light incident on each micromirror that works as a pixel can also be used.

The above embodiments have been described with reference to the projector 2 as an example of the image display apparatus, but the image display apparatus is not limited to the projector 2. For example, the image display apparatus may alternatively be a liquid crystal display, a plasma display, an organic EL (electro luminescence) display, or any other image display apparatus. When any of the direct-view image display apparatus described above is used, the instruction input unit that receives instruction about the position to be enhanced can be a touch panel, instead of the imaging unit 26, overlaid on a display screen.

What is claimed is:

1. An image display apparatus that allows recognition of a stereoscopic image based on binocular parallax, the apparatus comprising:
   a display unit that displays an image for the left eye and an image for the right eye;
   an instruction input unit that receives an instruction operation by which an area in the stereoscopic image is selected; and
   an image adjustment unit that adjusts the amount of parallax between the image for the left eye and the image for the right eye located in the area selected by the instruction operation and the amount of parallax between the image for the left eye and the image for the right eye located in an area outside the selected area using different amounts of adjustment.

2. The image display apparatus according to claim 1, wherein the image adjustment unit adjusts the amounts of parallax in such a way that the area selected by the instruction operation is recognized as if the selected area were located in front of the area outside the selected area.

3. The image display apparatus according to claim 1, wherein the image adjustment unit shifts the area selected by the instruction operation in at least one of the image for the left eye and the image for the right eye.

4. The image display apparatus according to claim 1, wherein the image adjustment unit shifts an area outside the area selected by the instruction operation in at least one of the image for the left eye and the image for the right eye.

5. A method for controlling an image display apparatus that displays an image for the left eye and an image for the right eye and allows recognition of a stereoscopic image based on binocular parallax, the method comprising:
   an instruction input step of receiving an instruction operation by which an area in the stereoscopic image is selected; and
   an image adjustment step of adjusting the amount of parallax between the image for the left eye and the image for the right eye located in the area selected in the instruction input step and the amount of parallax between the image for the left eye and the image for the right eye located in an area outside the selected area using different amounts of adjustment.

6. The method for controlling an image display apparatus according to claim 5, wherein in the image adjustment step, the amounts of parallax are so adjusted that the area selected by the instruction operation is recognized as if the selected area were located in front of the area outside the selected area.

7. The method for controlling an image display apparatus according to claim 5, wherein in the image adjustment step, the area selected by the instruction operation in at least one of the image for the left eye and the image for the right eye is shifted.

8. The method for controlling an image display apparatus according to claim 5, wherein in the image adjustment step, an area outside the area selected by the instruction operation in at least one of the image for the left eye and the image for the right eye is shifted.

9. The image display apparatus according to claim 1, wherein the instruction operation by which the area in the stereoscopic image is selected includes drawing a line surrounding a desired position of the area with an electronic pen on a projection surface.

10. The image display apparatus according to claim 1, wherein the image displayed by the display unit is divided into a plurality of predetermined areas, and the area is selected from the plurality of predetermined areas.

* * * * *